(12) United States Patent
Reynolds et al.

(10) Patent No.: US 12,196,141 B2
(45) Date of Patent: Jan. 14, 2025

(54) SYSTEMS AND METHODS WITH DISTRIBUTED BLEED FOR GAS TURBINE ENGINE COMPRESSOR STABILIZATION

(71) Applicant: HONEYWELL INTERNATIONAL INC., Charlotte, NC (US)

(72) Inventors: Bruce David Reynolds, Phoenix, AZ (US); Nick Nolcheff, Phoenix, AZ (US); Ryan Bernaud, Phoenix, AZ (US); Greyson Boyll, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/303,111

(22) Filed: Apr. 19, 2023

(65) Prior Publication Data
US 2024/0352896 A1    Oct. 24, 2024

(51) Int. Cl.
*F02C 9/18* (2006.01)
*F02C 3/08* (2006.01)
*F02C 9/20* (2006.01)
*F02C 9/22* (2006.01)
F04D 27/02 (2006.01)

(52) U.S. Cl.
CPC .............. *F02C 9/18* (2013.01); *F02C 3/08* (2013.01); *F02C 9/20* (2013.01); *F02C 9/22* (2013.01); *F04D 27/0223* (2013.01); *F04D 27/0246* (2013.01); *F05D 2270/101* (2013.01); *F05D 2270/304* (2013.01)

(58) Field of Classification Search
CPC ...... F02C 6/08; F02C 3/08; F02C 9/16; F02C 9/18; F02C 9/20; F05D 2270/101
See application file for complete search history.

(56) References Cited

U.S. PATENT DOCUMENTS

| | | |
|---|---|---|
| 3,365,892 A | 1/1968 | George |
| 3,848,636 A | 11/1974 | Mccombs |
| 3,925,980 A | 12/1975 | Mccombs |
| 3,994,617 A | 11/1976 | Mccombs |
| 3,996,964 A | 12/1976 | Mccombs |
| 4,186,767 A | 2/1980 | Caffrey |
| 6,550,254 B2 | 4/2003 | Proctor et al. |
| 6,663,346 B2 | 12/2003 | Munsell et al. |
| 7,543,439 B2 | 6/2009 | Butt et al. |

(Continued)

FOREIGN PATENT DOCUMENTS

| | | |
|---|---|---|
| CN | 111594321 B | 9/2021 |
| EP | 3485155 B1 | 6/2020 |
| GB | 1575528 A | 9/1980 |

*Primary Examiner* — Alain Chau
(74) *Attorney, Agent, or Firm* — Lorenz & Kopf LLP

(57) ABSTRACT

Systems and methods for stable operation of a compressor of a gas turbine engine include axial stages, each including a series of rotor blades. A centrifugal stage has a centrifugal impeller disposed downstream from the axial stages. Air flows through the compressor first through the axial stages and then through the centrifugal stage. Each respective axial stage includes mechanisms for the avoidance of certain operating conditions of the compressor such as surge. The mechanisms include variable vane sets disposed upstream from a series of the rotor blades or a bleed port or ports around the respective axial stage downstream from the series of rotor blades to selectively extract air from the respective axial stage.

19 Claims, 7 Drawing Sheets

(56) References Cited

U.S. PATENT DOCUMENTS

| | | |
|---|---|---|
| 7,591,183 B2 | 9/2009 | King |
| 8,292,567 B2 | 10/2012 | Damle et al. |
| 8,661,832 B2 | 3/2014 | Griffin et al. |
| 8,734,091 B2 | 5/2014 | Moniz et al. |
| 8,740,548 B2 * | 6/2014 | Rowe .................. F04D 29/563 |
| | | 415/48 |
| 8,869,537 B2 | 10/2014 | Geis et al. |
| 9,797,314 B2 * | 10/2017 | Hillel ................. F04D 27/0261 |
| 10,036,273 B2 | 7/2018 | Kozuch et al. |
| 10,132,246 B2 | 11/2018 | Lior et al. |
| 10,221,773 B2 | 3/2019 | Moniz et al. |
| 10,233,845 B2 | 3/2019 | Moniz et al. |
| 10,302,019 B2 | 5/2019 | Thomas, Jr. et al. |
| 10,408,217 B2 * | 9/2019 | Moeckel ............... F04D 27/023 |
| 10,563,592 B2 | 2/2020 | Snape et al. |
| 10,683,802 B2 | 6/2020 | Nithsdale |
| 10,794,272 B2 * | 10/2020 | Higgins .................. F02C 9/20 |
| 10,794,295 B2 | 10/2020 | Schwarz |
| 11,274,608 B2 | 3/2022 | Bulat et al. |
| 11,739,699 B2 * | 8/2023 | Drolet ................. F01D 17/105 |
| | | 415/160 |
| 2007/0013195 A1 | 1/2007 | Mukavetz et al. |
| 2010/0021285 A1 * | 1/2010 | Rowe .................. F04D 27/0246 |
| | | 415/125 |
| 2011/0056210 A1 * | 3/2011 | Griffin ..................... F02C 9/18 |
| | | 60/773 |
| 2011/0142602 A1 * | 6/2011 | Adhami .................. F02C 9/18 |
| | | 415/159 |
| 2013/0318973 A1 * | 12/2013 | Takahashi ............ F04D 29/706 |
| | | 60/726 |
| 2015/0354464 A1 * | 12/2015 | Hillel ................. F04D 27/0261 |
| | | 415/144 |
| 2017/0074172 A1 * | 3/2017 | Little ....................... F02C 7/18 |
| 2017/0268520 A1 * | 9/2017 | Moeckel ............... F04D 27/001 |
| 2018/0334966 A1 * | 11/2018 | Ortiz ..................... F01D 9/065 |
| 2019/0257246 A1 | 8/2019 | Higgins |
| 2020/0158589 A1 | 5/2020 | Schrewe et al. |
| 2020/0291871 A1 * | 9/2020 | Bulat ....................... F02C 9/20 |
| 2020/0347745 A1 * | 11/2020 | Liebschutz ............... F02C 9/20 |
| 2021/0254557 A1 | 8/2021 | McMurray |
| 2021/0285371 A1 | 9/2021 | Jaerling et al. |
| 2022/0145807 A1 | 5/2022 | Levasseur et al. |
| 2023/0026702 A1 * | 1/2023 | Beauchesne-Martel ................... F04D 27/001 |
| 2023/0143026 A1 * | 5/2023 | Drolet ................. F04D 27/001 |
| | | 415/160 |

\* cited by examiner

SYSTEMS AND METHODS WITH DISTRIBUTED BLEED FOR GAS TURBINE ENGINE COMPRESSOR STABILIZATION

TECHNICAL FIELD

Embodiments of the subject matter described herein generally relate to turbomachinery operation. More particularly, embodiments of the subject matter relate to a combination of variable geometry vanes and distributed bleed ports to manage stabilization at all axial stages of an axial-centrifugal compressor section of a gas turbine engine.

BACKGROUND

A turbomachine such as a gas turbine engine may be used to power various types of vehicles and/or systems. Gas turbine engines typically include a compressor that receives and compresses incoming gas such as air, a combustor in which the compressed gas is mixed with fuel and burned to produce high-pressure and high-velocity gas, and one or more turbines that extract energy from the gas exiting the combustor, which is then exhausted. Undesirable operating conditions such as stall and surge are preferably avoided by operating the engine to maintain stable conditions.

Engine compressors may include several stages, often as many as fourteen or more. Current trends toward higher overall pressure ratios to improve fuel efficiency has a tendency to limit the size of the aft compressor stages. Increased overall design pressure ratios may result in increased axial compressor mismatching from the front to rear stages, complicating stabilization, especially during off-design operation.

Accordingly, it is desirable to maintain stable operation of an engine's compressor including in operating conditions such as part-power. It is also desirable to deliver uniform air to the combustor. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In a number of embodiments, a system for stable operation of a compressor of a gas turbine engine includes axial stages, each including a series of rotor blades. A centrifugal stage has a centrifugal impeller disposed downstream from the axial stages. Air flows through the compressor first through the axial stages and then through the centrifugal stage. Each respective axial stage includes mechanisms for the avoidance of certain operating conditions of the compressor such as surge. The mechanisms include variable vane sets disposed upstream from a series of the rotor blades or a bleed port or ports around the respective axial stage downstream from the series of rotor blades to selectively extract air from the respective axial stage.

In a number of additional embodiments, a method for stable operation of a compressor of a gas turbine engine includes adding axial stages in the compressor, each respective axial stage in the axial stages having a series of rotor blades. Downstream from the axial stages, a centrifugal stage with an impeller is included in the compressor. Air flows is generated through the compressor, first through the axial stages and then through the centrifugal stage. To avoid certain operating conditions of the compressor, such as surge, in each respective axial stage either a variable vane set is disposed upstream from the series of rotor blades of the respective axial stage, and/or at least one bleed port is disposed around the respective axial stage downstream from the series of rotor blades. The variable vane set varies an open flow area for the air and the bleed port(s) selectively extract air from the respective axial stage.

In a number of other embodiments, a system for stable operation of a compressor of a gas turbine engine, the system includes two axial stages. Each axial stage includes a series of rotor blades. A stator with vanes is included in each of the axial stages and is disposed downstream from each respective series of rotor blades. Inlet guide vanes are disposed upstream from the axial stages. A centrifugal stage has a centrifugal impeller and is disposed downstream from the axial stages. A variable vane set is disposed upstream from the series of rotor blades in each of the axial stages to vary an open flow area for the air. At least one bleed port is disposed around each of the axial stages to selectively extract air. A bleed control valve is configured to control flow through the at least one bleed port of each respective axial stage. A bleed control actuator at each respective bleed control valve moves the respective bleed control valve to open and close. An inlet guide vane actuator is coupled with the inlet guide vanes to move the inlet guide vanes in opening and closing directions. At least one stator actuator is coupled with the stator vanes of one of the axial stages to move the stator vanes in opening and closing directions. A controller is coupled with the bleed control actuators, the inlet guide vane actuator, and the stator actuator. The controller determines whether the compressor is approaching the certain operating conditions. The controller operates, based on the speed and when the compressor is approaching the certain operating conditions, the inlet guide vanes through the inlet guide vane actuator, the stator vanes through the stator actuator, and the at least one bleed port through the bleed control actuators, for any combination of the axial stages to avoid the certain operating conditions.

BRIEF DESCRIPTION OF DRAWINGS

The present disclosure will hereinafter be described in conjunction with the following drawing figures, wherein like numerals denote like elements, and wherein.

DETAILED DESCRIPTION

Figure 1:
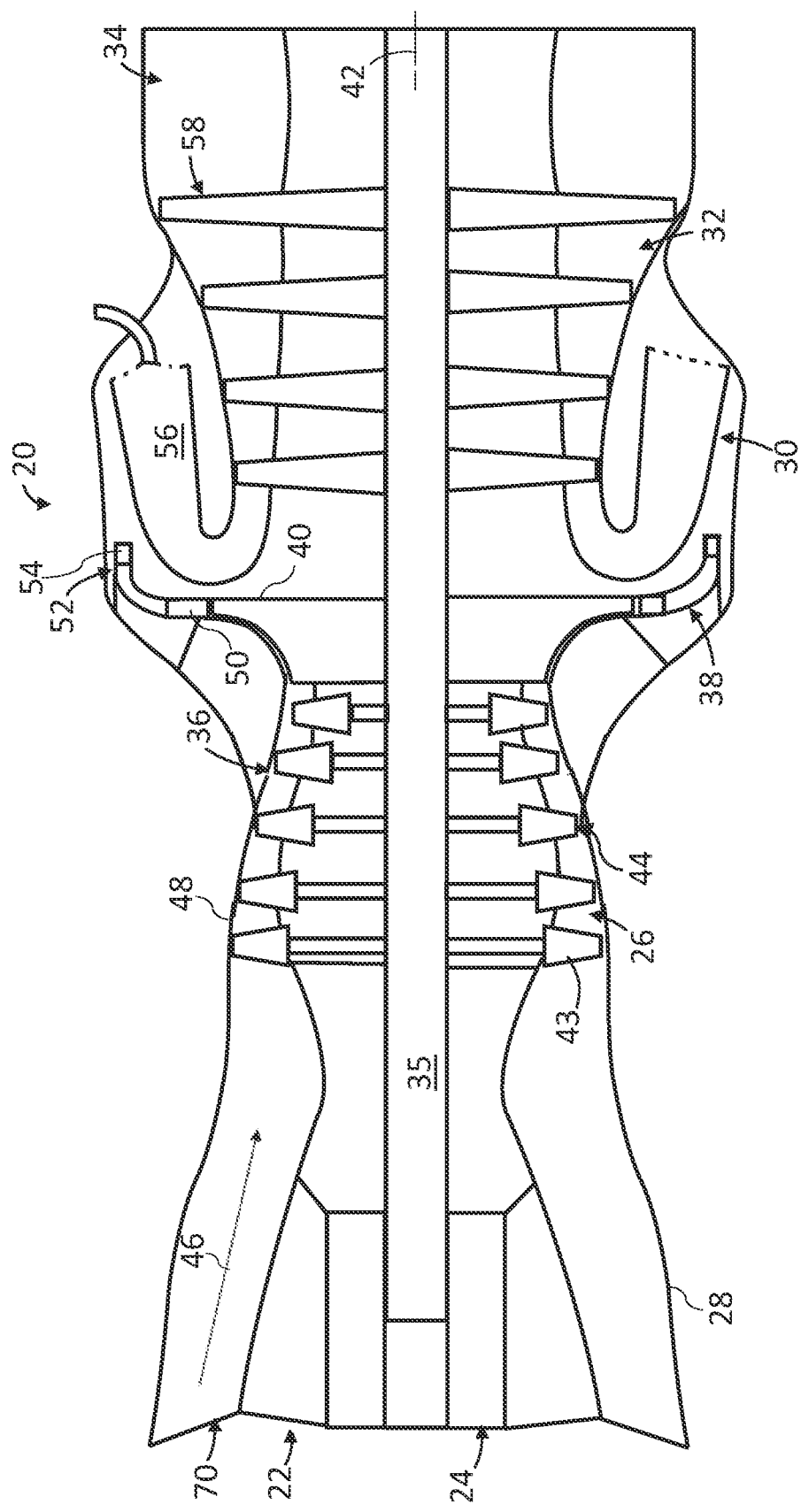
FIG. 1 is a schematic cross-sectional illustration of a turbomachine in the form of a gas turbine engine, according to an exemplary embodiment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

A schematic, sectioned view of an engine 20 is shown in FIG. 1 according to an exemplary embodiment. The engine 20 in general, includes an inlet section 22, a gearbox 24, a compressor section 26, a combustion section 30, a turbine section 32, a shaft 35, and an exit section 34, all of which may be disposed within, or defined by, a cowling 28 (with various internal shrouding not shown). In other embodiments, the engine 20 may be configured in different ways, such as in a turbofan configuration with a fan (not shown) in the inlet section 22. The compressor section 26, the combustion section 30, the turbine section 32, and the exit section 34 may collectively be referred to as the engine core 36. During operation, air enters the inlet section 22 from atmosphere and is directed into the compressor section 26. In other embodiments, the air may, for example, pass through a fan and/or an upstream low pressure compressor prior to reaching the compressor section 26. The compressor section 26 may include one or more rotors or impellers or a series of compressor rotors and/or impellers that increase the pressure of the air, which is then directed toward the combustion section 30, such as through a diffuser 38. The compressor section 26 may also include stators as described below. Air/gases generally flow through the core 36. Air directed out of the core 36 and that is not exhaust air that has passed through the combustion section 30 may be referred to as bleed. The engine assembly may include a number of additional components that are not illustrated in FIG. 1 for simplicity. For example, an inlet guide vane section may be located upstream of the compressor section 26.

The compressor section 26 includes a compressor 44 configured as an axial-centrifugal compression system with an axial rotor system 43 and with a centrifugal impeller 40 rotating about an axis 42. In general, including the centrifugal impeller 40 enables reducing the number of axial stages in the compressor 44. In the current embodiment, there are five axial rotors in the axial rotor system 43. In other embodiments, any number of axial stages, including a single stage, may be employed. The impeller 40 rotates imparting velocity to the air 46 received from the inlet section 22 through an inlet 70, and through a case 48 around the impeller 40. The air exiting the impeller is directed substantially radial in its exit air direction that is outward into the diffuser 38. The diffuser 38 includes a number of circumferentially distributed diffuser vanes 50 defining flow passages of a flow path to the combustion section 30. The diffuser 38 directs the air through the flow path into a deswirl section 52. The deswirl section 52 includes another set of circumferentially distributed vanes 54 to straighten/remove swirl of the flow leaving the compressor section 26. Between the diffuser vanes 50 and the deswirl section 52, the air is directed through the flow path, which turns the flow from the substantially radial direction more toward the axial direction and, through the deswirl section 52, on to the combustion section 30.

In the combustion section 30, the straightened high-pressure air from the compressor section 26 is mixed with fuel and combusted in a combustor 56. The gases from the combusted fuel and air are then directed into the turbine section 32. The turbine section 32 includes a rotor 58 with a series of turbines, which may be disposed in axial flow series or in other arrangements and which also rotate about the axis 42, which in this embodiment is a common axis 42 with the compressor 44. The combustion gas from the combustion section 30 expands through, and rotates, the rotor 58 of the turbine section 32, from which power is derived. From the turbine section 32, the air/gas is then exhausted from the engine core 36 through the exit section 34 to the atmosphere. In other embodiments, the air/gas may pass through additional sections such as a low pressure turbine prior to reaching atmosphere.

Figure 2:
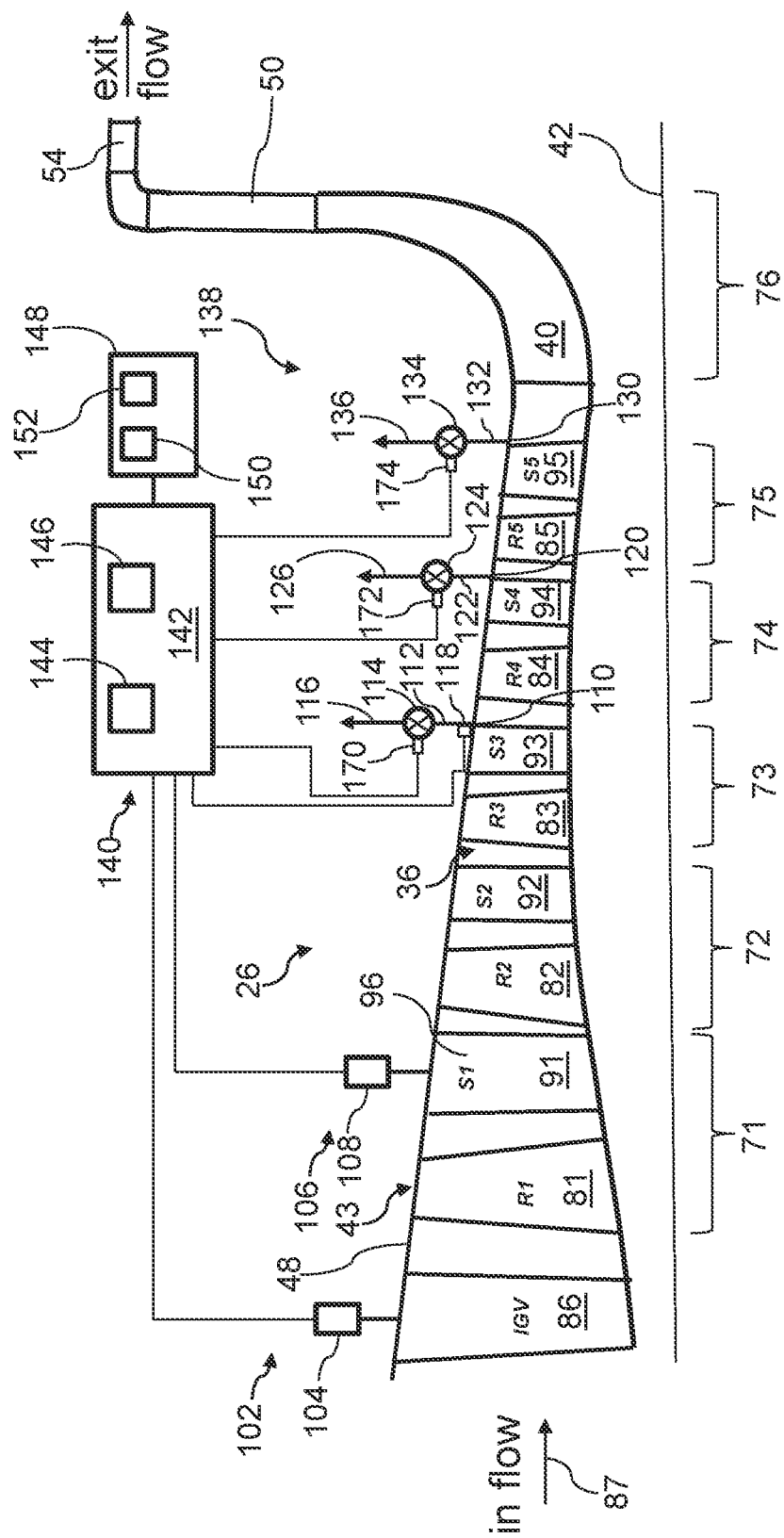
FIG. 2 is a schematic illustration of the compressor section area of the gas turbine engine of FIG. 1, according to an exemplary embodiment.

Referring additionally to FIG. 2, the compressor section 26 includes six stages 71-76. The stages 71-75 define the axial rotor system 43, which includes five rotors individually identified as rotors 81-85. The stage 76 includes the impeller 40. The rotors 81-85 being of the axial type, move air substantially parallel to the axis 42. The impeller 40, being of the centrifugal type moves air from an axially incoming direction through a turn of the flow to a direction that is substantially perpendicular to the axis 42. Each of the rotors 81-85 and the impeller 40 increase the speed of the airflow through the engine core 36. The rotor 81 is preceded (in the direction of air flow 87) by inlet guide vanes 86. The inlet guide vanes 86 are distributed circumferentially around the axis 42 and may be variably positioned and provide a desired direction of the air reaching the stage 71. Each of the rotors 81-85 is followed by a stator 91-95, respectfully. The rotors 81-85 each direct the air in a substantially axial direction in its velocity component. A combination of one of the rotors 81-85 and its respective stator 91-95 is a respective stage 71-75 of the axial rotor system 43 of the compressor 44. The stators 91-95 may each have vanes that may be fixed or variable, with limitations as described below. The stators 91-95 convert the kinetic energy of the air delivered from the rotors 81-85 to static pressure. In addition to raising the pressure of the air, the stators 91-95 also redirect air flow so that is properly enters the next rotor 82-85 or the impeller 40. The number of stages 71-76 may vary in other embodiments and the number is selected to achieve the desired pressure for delivery to the combustor 56 after the last stage.

In the current embodiment, the stators 92-95 have vanes that are fixed and not capable of being variably positioned. The inlet guide vanes 86 are variable, meaning they are selectively rotated to control the open area seen by the air flow and thereby to control the pressure at the rotor 81. The vanes 96 of the stator 91 are also variable, meaning they are selectively rotated to control the open area seen by the air flow and thereby the pressure at the rotor 82. The stages 71, 72 with preceding variable vanes are all located upstream from the stages 73-75 with bleed as described below. To rotate, the inlet guide vanes 86 are connected with a drive system 102, which includes an actuator 104, such as a motor, to effect movement. Similarly, to rotate the vanes 96 of the stator 91 are connected with a drive system 106, which includes an actuator 108, such as a motor, to effect movement.

In some embodiments, the stator 92 may be variable. However, in the current embodiment, the stator 92 is fixed because one or more bleed ports 110 are provided immediately after the stage 73 (at discharge from the stage 73 and specifically immediately at the downstream end of the stator 93) to control pressure at the rotor 83. The bleed port(s) 110 may be configured as a plural number of holes distributed around the periphery of the case 48 to maintain a consistent pressure around the rotor 83. In some embodiments, the bleed port(s) 110 may be configured differently, such as via an annular slot or other opening or openings. The bleed port(s) 110 are positioned downstream/aft of rotor 83. In the current embodiment, the bleed port(s) 110 are located at the trailing edge of the stator 93. In some embodiments, the bleed port(s) 110 may be located between, in the axial direction, rotor 83 and stator 93. In some embodiments, the bleed port(s) 110 may be located along the axial length of stator 93. In some embodiments, the bleed port(s) 110 may be located between, in the axial direction, the stator 93 and the rotor 84. The bleed port(s) 110 are coupled, through a conduit 112, with a bleed control valve 114. The bleed control valve 114 controls flow from the bleed port(s) 110 to an outlet 116 that directs flow out of the engine core 36 and which may be coupled, for example, with the exit section 34 or with the inlet 70, or may otherwise direct bleed air to a location where pressure is lower than at the bleed port(s) 110 and that can accept and/or use bleed flow. The bleed control valve 114 may be configured as an on/off valve or may be variably controlled.

In addition, the stator 93 is fixed because bleed port(s) 120 are provided immediately after the stage 74 to control pressure at the rotor 84. The bleed port(s) 120 may be distributed around the periphery of the case 48 to maintain a consistent pressure around the rotor 84. The bleed port(s) 120 are coupled, through a conduit 122, with a bleed control valve 124. The bleed control valve 124 controls flow from the bleed port(s) 120 to an outlet 126 that directs flow out of the engine core 36 and which may be coupled, for example, with the exit section 34 or with the inlet 70, or may otherwise direct air to a lower pressure location and can accept and/or use bleed flow.

Further, the stator 94 is fixed because bleed port(s) 130 are provided immediately after the stage 75 to control pressure at the rotor 85. The bleed port(s) 130 may be distributed around the periphery of the case 48 to maintain a consistent pressure around the rotor 85. The bleed port(s) 130 are coupled, through a conduit 132, with a bleed control valve 134. The bleed control valve 134 controls flow from the bleed port(s) 130 to an outlet 136 that directs flow out of the engine core 36 and which may be coupled, for example, with the exit section 34 or with the inlet 70, or the outlet 136 may otherwise direct air to the atmosphere. As a result, there are five axial stages 71-75 and each of the five axial stages 71-75 includes either a variable vane mechanism (inlet guide vanes 86, vanes 96 of the variable stator 91) or a bleed control valve (114, 124, 134) to control pressure at the respective stage 71-75 as parts of a pressure control system 138. As noted above, in some embodiments the stage 72 may include a variable vane mechanism for the stator 92 instead of the bleed control valve 114 to control pressure at the stage 73. The stator 95 is fixed and not variable because it precedes the impeller 40.

The engine 20 includes a control system 140, which is also couple with the compressor section 40. The control system 140 may be a full authority digital engine control (FADEC) system, such as when the engine 20 is used in an aircraft. The control system 140 includes a controller 142, which may comprise multiple controllers and may include any number of electronic control modules to effect desired control of the engine 20 and its associated systems. The controller 142, in general, receives information from various sources, process that information, and provides control signals/commands based thereon to effect operation of the engine 20 and/or other systems. It will be appreciated that any number of sensors may monitor parameters of the engine 20 and its related systems, including the compressor 44, and, via signals, supply that information to the controller 142.

The controller 142 includes a processor 144, a memory device 146, and includes or is coupled with a storage device 148. The processor 144 performs the computation and control functions of the controller 142 and during operation executes one or more programs 150 and may use data 152, each of which may be contained within the storage device 148. As such, the processor 144 controls the general operation of the controller 142 in executing the operations and processes described herein. The memory device 146 may be any type of suitable memory or combination of memory devices capable of holding the programs 150, some of which represent executable instructions, used by the controller 142. In the illustrated embodiment, the memory device 146 may store the above-referenced programs 150 along with one or more stored values of the data 152 such as for short-term data access. The storage device 148 stores the data 152, such as for long-term data access for use in automatically controlling the engine 20 and other systems and may be any suitable type of storage apparatus. In an exemplary embodiment, the storage device 148 comprises a source from which the memory device 146 receives the programs 150 and the data 152. The programs 150 represent executable instructions, used by the controller 142 in processing information and in controlling the engine 20 and other systems, including the compressor 44 and its related actuators. The processor 144 may generate control signals for the engine 20 and other systems, including the pressure control system 138, based on the logic, calculations, methods, and/or algorithms.

Each of the bleed control valves 114, 124, 134 includes a respective actuator 170, 172, 174, such as a rotary or linear actuator, to position the bleed control valves 114, 124, 134 to various closed and/or opened states or to position the bleed control valves 114, 124, 134 in on/off states. The actuators 170, 172, 174 and the actuators 104, 108 of the inlet guide vanes 86 and the vanes 96 of the stator 91 respectively, are coupled in the control system 140 with the controller 142 for operation, such as by the processor 144. In general, pressure is individually controlled at each of the stages 71-75, such as to avoid undesirable operational conditions such as stall/surge of each of the rotors 81-85. Individual control results is the ability to minimize the overall amount of bleed needed to stabilize the system. In embodiments, pressure at the stages 71-75 may be monitored by sensors, with sensor 118 at stage 73 being one example, which may be replicated at other stages 71-72, and 74-75.

Figure 3:
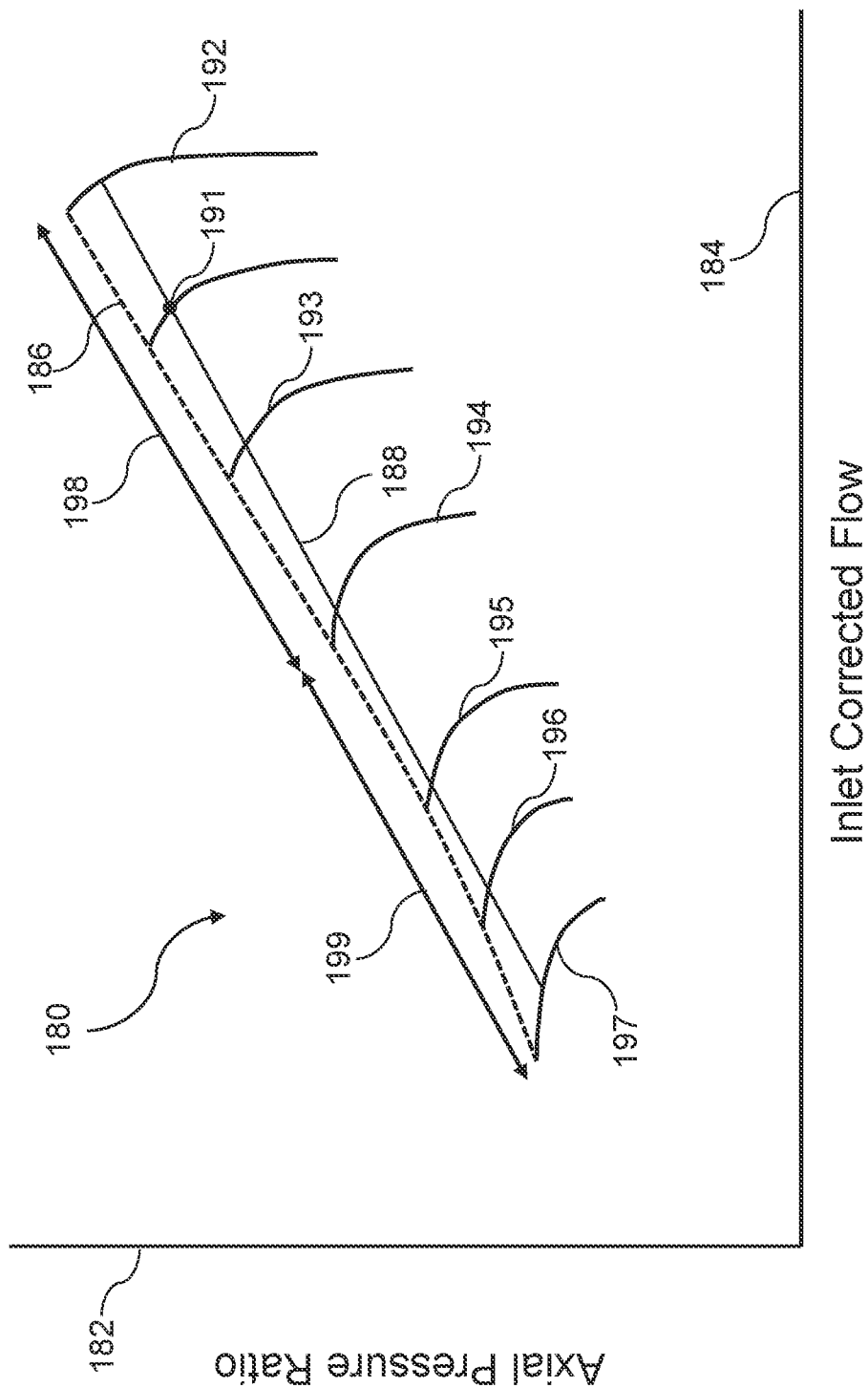
FIG. 3 is a graph of the cumulative pressure ratio of the axial stages vs the corrected flow into the inlet of the first axial stage for the gas turbine engine of FIG. 1, according to an exemplary embodiment.

Referring to FIG. 3, a map 180 for the engine 20 is schematically shown in terms of axial pressure ratio on the vertical axis 182 for the stages 71-75 versus flow through the compressor 44 on the horizontal axis 184. The curve 186 represents the surge line for the axial stages 71-75 of the compressor 44. Because the impeller 30 is generally stable, the overall surge line of the compressor 44 is generally set by the axial surge line. The curve 186 delineates undesirable operating conditions and represents a limit with regard to the pressure that may be generated by the compressor 44, which varies relative to flow. The curve 188 represents the operating line for the compressor 44 as controlled by the controller 142, such as via the processor 144. The operating line of the curve 188 is positioned away from the surge line of the curve 186 to allow room for transients without incursions with the curve 186 such as during rapid acceleration and other maneuvers where the instantaneous operating pressure may vary slightly from the operating line of the curve 188 without hitting the surge line of the curve 186.

Also in FIG. 3, the point 191 on the curve 188 represents performance of the compressor 44 at one hundred percent (100%) speed on the operating line of the curve 188. In embodiments, the point 191 represents the design operation of the engine 20. The design operation (rotational speed, flow and pressure ratio) for the compressor 44 is selected to allow a calibrated design system to provide a configuration that meets operational requirements for the compressor 44. Operating at other speeds, including along the curve 188, represents off-design operation of the engine 20.

The curve 192 represents operation at 105% of design speed. The curve 193 represents operation at 95% of design speed. The curve 194 represents operation at 90% of design speed. The curve 195 represents operation at 85% of design speed. The curve 196 represents operation at 80% of design speed. The curve 197 represents operation at 70% of design speed. A range 198 of operational speeds of the engine 20 is defined from approximately 90% of design speed and above (speeds faster than 90%). These speeds may be referred to as high speeds. Another range 199 of operational speeds of the engine 20 is defined from approximately 90% of design speed and below (speeds slower than 90%). These speeds may be referred to as part-power speeds.

In embodiments, the avoidance of stall/surge is effected through scheduling (positioning) of the variable inlet guide vanes 86 and/or the vanes 96 of the stator 91 when operation falls in the range 198 when speeds are greater than 90% of design speed. Accordingly, at high speeds stall/surge is avoided by modulating the inlet guide vanes 86 and/or the vanes 96. Also in embodiments, the avoidance of stall/surge is effected through scheduling of the variable inlet guide vanes 86 and/or the vanes 96 of the stator 91 along with operation of the bleed control valves 114, 124, 134 in the range 198 when speeds are less than 90% of design speed. Accordingly, in part-power operation stall/surge is avoided by both modulating the inlet guide vanes 86 and/or the vanes 96 and operation of the bleed control valves 114, 124, 134.

In general, with the impeller 40 as a centrifugal type of compressor for the stage 76, the vanes 86, 96 and the bleed valves 114, 124, 134 are scheduled to maintain stable operation of the compressor 44. Each and every stage 71-76 in the axial rotor system 43 includes a mechanism to avoid undesirable operating conditions such as stall and surge. By effecting relatively small amounts of bleed from multiple stages 73-75, which have axial rotors 83-85 and which do not have variable geometry vanes operational benefits are achieved. For example, stall, surge and other undesirable operating conditions may be avoided through multiple tools. Distributing bleed to each stage 73-75 that does not have variable geometry vanes (as in stages 71, 72) results in lower overall bleed flow as compared to non-distributed bleed. In this context, distributed bleed means that every axial stage of the compressor 44 that does not have variable vanes in front of its rotor has bleed capability to address certain operating conditions such as stall and surge. Lower total bleed is desirable because it leads to benefits such as a cooler operating engine 20. The impeller 40 is generally characterized by stable operation over a broad range of operating conditions and does not include bleed or variable geometry to maintain stability/avoid surge. In embodiments, inclusion of the impeller 40 contributes to improved overall stability of the compressor 44 by providing inherent stability to the back end of the compressor section 26. In some embodiments, bleeds may be located in the compressor 44, including in the axial stages and/or the centrifugal stage for a variety of reasons, including reasons other than to maintain stability to avoid surge. For example, additional bleeds may be added to provide a flow source for a range of engine requirements not associated with surge/stall. These may include, but are not limited to, anti-ice systems, customer specific uses, cooling, buffering, and/or thrust load control. These auxiliary function bleeds are not scheduled to operated to manage stability of the compressor 44, as are the bleeds that are controlled by the bleed control valves 114, 124, 134.

Figure 4:
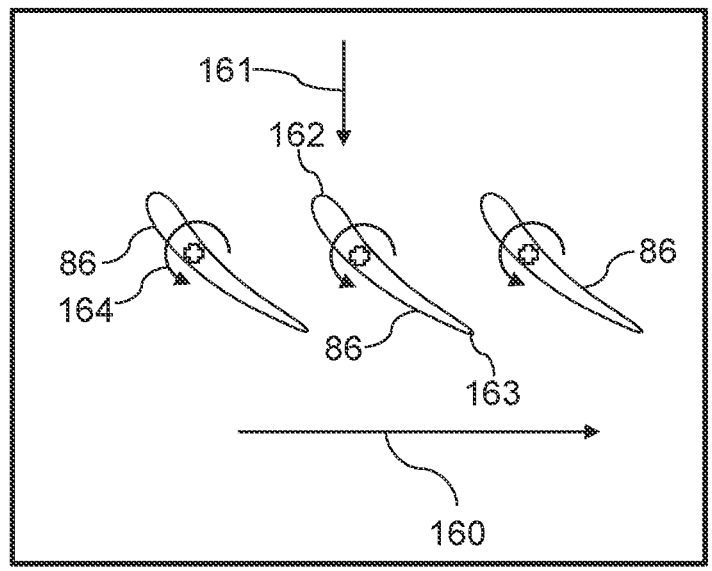
FIG. 4 is schematic illustration of a set of inlet guide vanes in a closed state, according to an exemplary embodiment.
Figure 5:
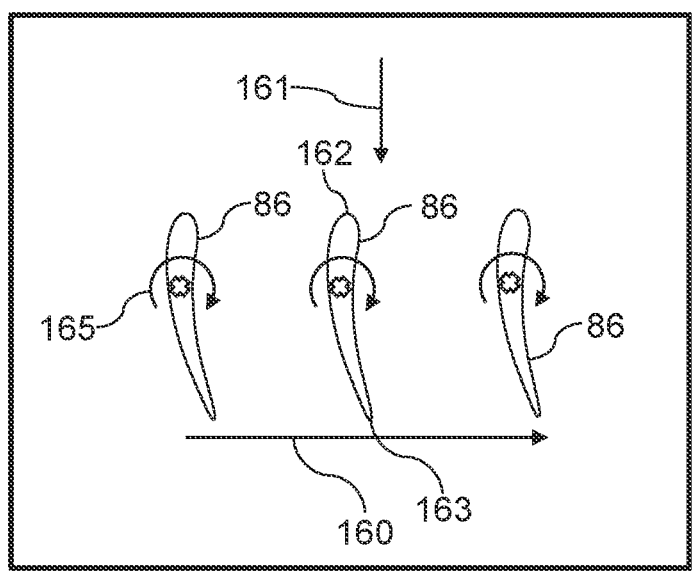
FIG. 5 is schematic illustration of a set of inlet guide vanes in an opened state, according to an exemplary embodiment.

The inlet guide vanes 86 may be controlled by being opened and closed to varying degrees. FIGS. 4 and 5 schematically show a series of three of the inlet guide vanes 86 in more closed positions in FIG. 4 and in more open positions in FIG. 5. The inlet guide vanes 86 are shown as viewed from a perspective of looking from a radially outward position in toward the axis 42 of the engine 20. The direction of rotation 160 of the compressor 44 and its rotor 81 imparts air flow 161 through the inlet guide vanes 86. Each vane has a leading edge 162 and a trailing edge 163, located downstream from the leading edge 162. The closing movement 164 rotates each of the inlet guide vanes 86 so that they rotate the trailing edges 163 in the same direction as the direction of rotation 160 of the rotor 81. In FIG. 5 the inlet guide vanes 86 are shown fully open and have moved in an opening movement 165. The opening movement rotate the inlet guide vanes 86 so that their trailing edges 163 move against the direction of rotation 160 of the rotor 81.

Figure 6:
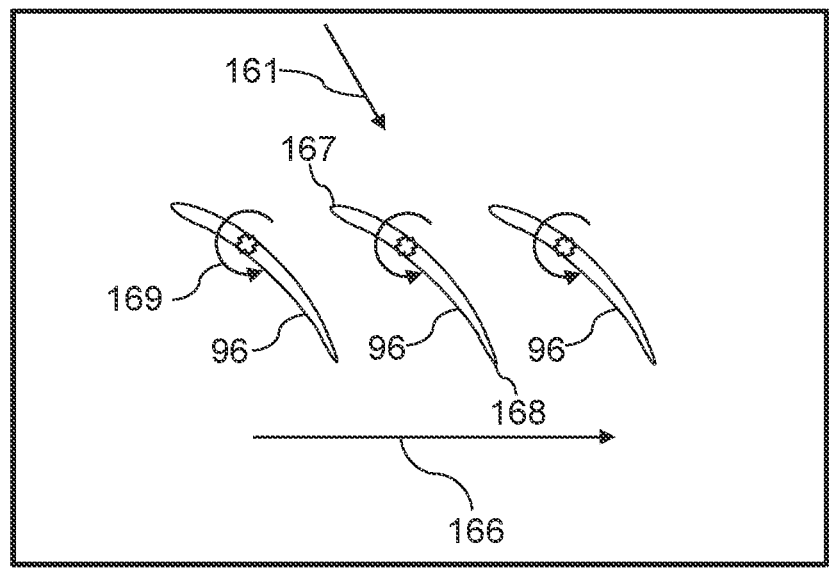
FIG. 6 is schematic illustration of a set of stator vanes in a closed state, according to an exemplary embodiment.
Figure 7:
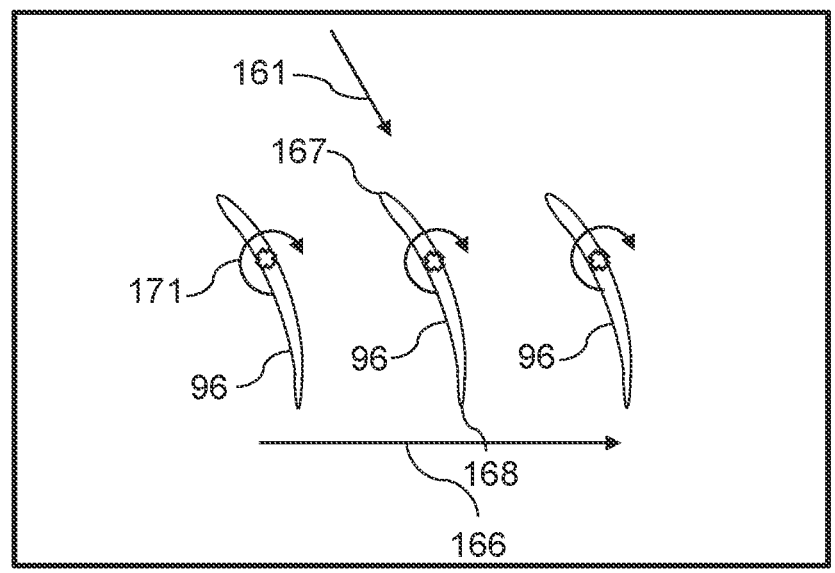
FIG. 7 is schematic illustration of a set of stator vanes in an opened state, according to an exemplary embodiment.

The vanes 96 of the stator 91 may also be controlled by being opened and closed to varying degrees. FIGS. 6 and 7 schematically show a series of three of the vanes 96 of the stator 91 in more closed positions in FIG. 6 and in more open positions in FIG. 7. The vanes 96 are shown as viewed from a perspective of looking from a radially outward position in toward the axis 42 of the engine 20. The direction of rotation 166 of the compressor 44 and its rotor 82 imparts the air flow 161 through the vanes 96. Each vane has a leading edge 167 and a trailing edge 168, located downstream from the leading edge 167. The closing movement 169 rotates each of the vanes 96 so that they rotate the trailing edges 168 in the same direction as the direction of rotation 166 of the rotor 82. In FIG. 7 the vanes 96 are shown more open and have moved in an opening movement 171. The opening movement 171 rotates the vanes 96 so that their trailing edges 168 move against the direction of rotation 166 of the rotor 82.

In general, the inlet guide vanes 86 and/or the vanes 96 may be rotated in their respective closing direction 162, 169 to reduce the flow capacity, work and pressure rise of the respective downstream rotor 81, 82. Controlling the positions of the inlet guide vanes 86 and the vanes 96 enables improving flow match between the front stages of the compressor 44 and its rear stages. Improving flow match may be helpful in operating conditions such as when the rear stages are flow constrained.

Variable geometry scheduling type control is used at higher speeds (open vanes) in the range 198 to maintain flow into the compressor 44 where more flow moves the operating point to the right on the map creating space from the surge line of the curve 186. Variable geometry scheduling type and bleed type control is used at lower speeds (move vanes in a closed direction and open bleed) to lower pressure and create space between operation and the surge line of the curve 186. In an example, moving the vanes 86, 96 may be used to reduce the flow capacity, work and pressure rise of the downstream rotors 81, 82), At part-power of the engine 20, such as when the speeds are below 90%, using a combination of closing the vanes 86, 96 and opening bleed provides the benefit of making the stages 71 and 72 appear smaller in operation while making the stages 73-75 appear larger in operation. This overcomes the character of the stages 73-75 appearing smaller at part-power operation when they are not controlled by the current approach. A smaller operating appearance increases a risk of surge and stall and so the current approach, in increasing the apparent size, helps avoid stall, surge, etc. In other applications, rather than initiating bleed and/or vane movement below 90% speed, operation may be initiated at other part-speed levels, such as somewhere in the range from 85% to 99%, or at other speeds when needed.

Figure 8:
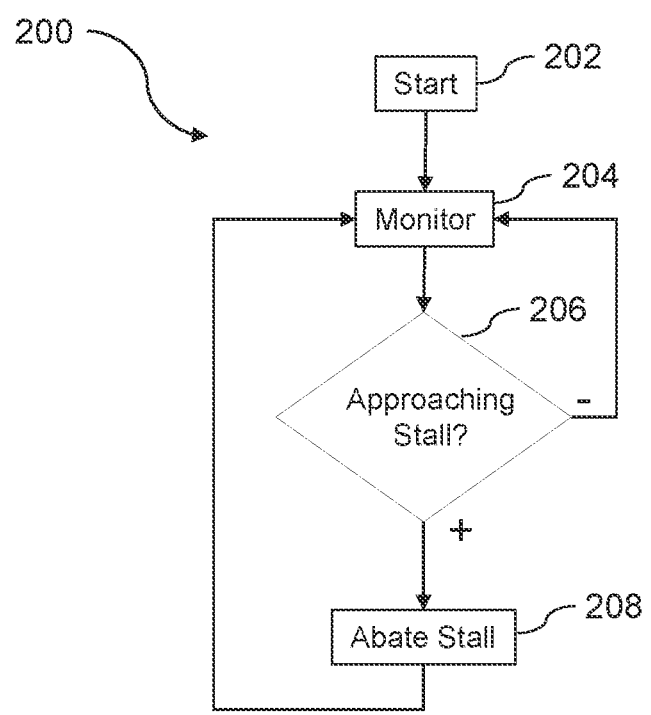
FIG. 8 is a method for stabilizing the compressor section of the gas turbine engine of FIG. 1, according to an exemplary embodiment.

Referring to FIG. 8, a method 200 for stable operation of the gas turbine engine 20 is shown. Various steps or parts of the method 200 may be carried out by the controller 142 and/or other controllers and through any number of individual modules. As will be appreciated in light of the disclosure, the order of operation within the method 200 is not limited to the sequential execution as illustrated in FIG. 8 but may be performed in one or more varying orders as applicable and in accordance with the present disclosure. In various embodiments, the method 200 starts 202 and may be scheduled to run based on one or more predetermined events, and/or may run continuously during operation of the engine 20.

Following the start 202, the method 200 monitors 204 parameters of the stages 71-75 for any approaching undesired operating states such as stall and surge. Generally, the controller 142 operates the fuel system of the engine 20 to maintain parameters away from operating conditions conducive to stall and surge. Monitoring 204 may be indirect, such as based on the commanded speed of the engine 20, or direct, such as by sensed pressures at the stages 71-75. For example, sensors such as the sensor 118 of FIG. 2 may provide signals representative of pressure at the stages 71-75 to the controller 142. The method 200 proceeds to determine 206 whether the monitored 204 parameters are indicative of approaching an undesirable operating state such as stall and surge. For example, the determination 206 may include evaluating whether the engine 20 has departed from the desired operating line represented by the curve 188 of FIG. 3 and is approaching the surge line represented by the curve 186. When the determination 206 is negative, meaning the operation of the engine 20, and specifically of the compressor 44 is not approaching undesirable conditions, the method 200 returns to monitoring 204 and proceeds therefrom. When the determination 206 is positive, meaning the operation of the engine 20, and specifically of the compressor 44 is approaching undesirable conditions, the method 200 proceeds to abatement 208 of the conditions.

Scheduling of the abatement 208, in general, includes control actions to avoid reaching the undesirable conditions. In embodiments, abatement 208 operation may be according to predetermined schedules, such as relative to the commanded operating speed of the engine 20 by the controller 142. For example, the processor 144 may access, such as from the storage device 148, charts/tables/data 152, to schedule the vanes 86, 96 and the surge control valves 114, 124, 134 for the operating speed. The data 152 may be developed using commercially available modelling software and/or by testing, such as computational fluid dynamics modelling and prototype rig testing. During design and development of the compressor 44, testing may be used to identify when stall/surge occurs and the respective conditions that initiate stall/surge may be identified. Then the controller 142 is programmed to maintain the operating point of the compressor 44 away from the stall or surge lines.

Figure 9:
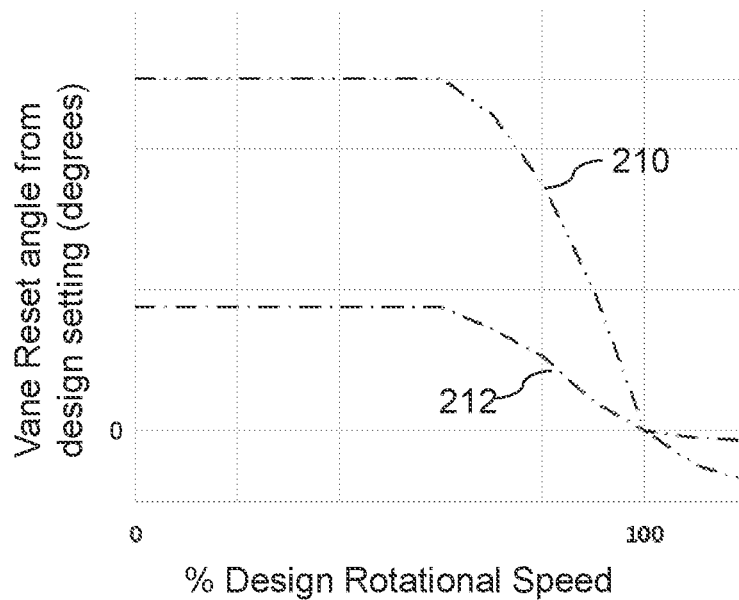
FIG. 9 is a graph of vane reset angle versus rotational speed of the gas turbine engine of FIG. 1, according to an exemplary embodiment.

Referring to FIG. 9, an example vane schedule is shown in graph form with vane reset angle shown on the vertical axis as varies from design setting at zero, versus rotational speed on the horizontal axis in percent, with 100% being design speed. The graph shows a curve 210, which represents the inlet guide vanes 86 and a curve 212, which represents the vanes 96 of the stator 91. Both curves 210, 212 are at a vane rest angle of zero for 100% design speed. As depicted by the curves 210, 212, the vane reset angles vary as a function of rotational speed. As shown, the inlet guide vanes 86 may be moved to a greater degree than the vanes 96 at the same speed. Closing reset angles apply to the left of 100% design speed and opening reset angles apply to speeds above 100% design speed. Accordingly, the angles of the vanes 86, 96 are controlled as a function of speed.

Figure 10:
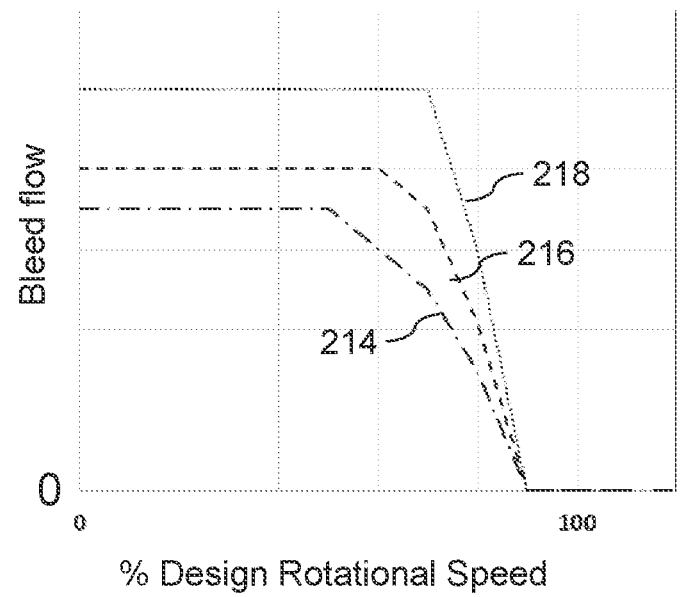
FIG. 10 is a graph of bleed flow versus rotational speed of the gas turbine engine of FIG. 1, according to an exemplary embodiment.

Referring to FIG. 10, an example bleed schedule is shown in graph form with bleed flow shown on the vertical axis versus rotational speed on the horizontal axis in percent, with 100% being design speed. In the graph curve 214 represents the bleed ports 110, the curve 216 represents the bleed ports 120 and the curve 218 represents the bleed ports 130. The amount of scheduled bleed flow increases for each of the bleed ports 110, 120, 130 for speeds below 90% of design speed and is zero for speeds above 90% of design speed. Accordingly, the bleed flow rates through the bleed ports 110, 120, 130, as controlled by the bleed control valves 114, 124, 134 are controlled as a function of rotational speed and its departure from 100% design speed.

In embodiments, abatement 208 operation may be in response to sensed or control data, such as of pressure at a stage 71-75, to schedule the vanes 86, 96 and the surge control valves 114, 124, 134. For example, pressure at the sensor 118 may indicate that the stage 73 is approaching stall or surge, in which case the abatement 208 is applied to stage 73. Other sensors like the sensor 118 may be located at each of the other stages 71-72 and 74-75. The abatement 208 may include actions for any or all of the stages 71-75 effected through operation of the actuators 104, 108, 170, 172, and/or 174 by the controller 142 via the processor 144. Variable geometry scheduling type control is used at higher speeds (open vanes) in the range 198 to maintain flow into the compressor 44. A combination of variable geometry scheduling type and bleed type control is used at lower speeds (move vanes in a closed direction and open bleed) to lower pressure and create space between operation and the surge line of the curve 186.

In an example, the determination 206 may result in an identified stage or stages approaching undesirable conditions. For a part-power example, stall or surge may be identified in stages 72, 74 and 75. In this example, surge is not incipient in stages 71 and 73. In this example, the controller 142, via the processor 144 may operate the actuator 108 to further close the vanes 96 of the stator 91 to reduce airflow into the stage 72 avoiding an incursion with the surge line of the curve 186. The controller 142, via the processor 144 may operate the actuator 172 to open the bleed control valve 124 to bleed air from the stage 74 at the downstream end of the stator 94, lowering pressure in the stage 74 and avoiding an incursion with the surge line of the curve 186. In addition, the controller 142, via the processor 144 may operate the actuator 174 to open the bleed control valve 134 to bleed air from the stage 75 at the downstream end of the stator 95, lowering pressure in the stage 75 and avoiding an incursion with the surge line of the curve 186. In this example, the inlet guide vanes 86 are not actuated and the bleed control valve 114 is not actuated as stall or surge in those stages was not determined 206. Accordingly, each of the stages 71-75 is addressed individually. In addition, by addressing surge in three of the five axial stages, the total amount of bleed air extracted from the core flow is beneficially minimized. Following the abatement 208, the method 200 returns to monitoring 204 and continues to make adjustments to maintain the engine 20 on the operating line of the curve 188.

As disclosed herein, each axial stage of an axial-centrifugal compressor section is managed to schedule air flow or bleed-out adjustments to avoid undesirable operating conditions such as stall, surge, etc. to maintain stable operating conditions at the design operating line of a gas turbine engine compressor. Overall surge bleed levels are minimized while managing off-design compressor operation by effectively managing bleed effectiveness and extraction location. The fully distributed (at all axial stages) bleed extraction and variable vane protection provides the flexibility to target individual stage surge conditions.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for stable operation of a compressor of a gas turbine engine, the system comprising:
   axial stages, each respective axial stage in the axial stages including a rotor, each rotor having rotor blades;
   a centrifugal stage having a centrifugal impeller disposed downstream from the axial stages,
   wherein air flows through the compressor first through the axial stages and then through the centrifugal stage,
   wherein each and every respective axial stage of the axial stages is configured for avoidance of certain operating conditions of the compressor by one of:
   a variable vane set disposed upstream from the rotor blades of the respective axial stage, the variable vane set configured to vary relative to rotational speed of the compressor; or
   at least one bleed port around the respective axial stage, the at least one bleed port configured to selectively extract air from the respective axial stage,
   wherein a plural number of the axial stages include the at least one bleed port so that bleed from the gas turbine engine is distributed among the plural number of axial stages,
   wherein each individual stage of the plural number of the axial stages is configured with the at least one bleed port being disposed at a location that is downstream from the rotor blades of the respective individual axial stage and,
   wherein at least one of the axial stages include the variable vane set, wherein the variable vane sets include inlet guide vanes and stator vanes and further comprising:
a bleed control valve configured to control flow through the at least one bleed port;
a bleed control actuator at each respective bleed control valve configured to move the respective bleed control valve to open and close;
an inlet guide vane actuator coupled with the inlet guide vanes to move the inlet guide vanes in opening and closing directions;
at least one stator actuator coupled with the stator vanes of at least one of the axial stages to move the stator vanes in opening and closing directions; and
at least one controller coupled with the bleed control actuators, the inlet guide vane actuator, and the at least one stator actuator, the controller configured to:
determine whether the compressor is approaching the certain operating conditions; and
operate, based on the speed and when the compressor is approaching the certain operating conditions, the inlet guide vanes through the inlet guide vane actuator, the stator vanes through the stator actuator, and the at least one bleed port through the bleed control actuators, for any combination of the axial stages to avoid the certain operating conditions.

2. The system of claim 1, wherein each individual stage of the plural number of axial stages includes the stator vanes disposed downstream from the rotor of the respective individual stage, wherein the at least one bleed port of the respective individual stage is disposed at a location that is downstream from the stator vanes of the same respective individual stage.

3. The system of claim 1, wherein the variable vane set and the at least one bleed port are not included in the centrifugal stage to maintain stability of the compressor.

4. The system of claim 1, comprising a controller configured to:
monitor a speed of the engine;
determine whether the compressor is approaching the certain operating conditions; and
schedule, based on the speed and when the compressor is approaching the certain operating conditions, operation of the variable vane set and the at least one bleed port for at least one of the axial stages to avoid the certain operating conditions.

5. The system of claim 1, comprising a controller configured to:
monitor a speed of the engine;
determine whether the compressor is approaching the certain operating conditions;
schedule, based on the speed and when the compressor is approaching the certain operating conditions, operation of the variable vane set and the at least one bleed port for all of the axial stages to avoid the certain operating conditions.

6. The system of claim 1, wherein the at least one bleed port comprises bleed ports configured so that a total bleed from the gas turbine engine is distributed among every one of the axial stages that do not include the variable vane set by having at least some of the bleed ports at the every one of the axial stages that do not include the variable vane set.

7. The system of claim 1, comprising a controller configured to:
monitor a speed of the engine;
determine whether the compressor is approaching the certain operating conditions;
schedule, when the compressor is approaching the certain operating conditions and the speed is above a threshold, the variable vane set to move in an opening direction and the at least one bleed port to remain closed; and
schedule, when the compressor is approaching the certain operating conditions and the speed is below the threshold, the variable vane set to moving in a closing direction and the at least one bleed port to open.

8. The system of claim 1, wherein the certain operating conditions include surge of the compressor, and the variable vane set is controlled to close the variable vane set to reduce flow through, and work input of, the respective stage.

9. The system of claim 1, comprising:
a bleed control valve configured to control flow through the at least one bleed port;
a bleed control actuator configured to move the bleed control valve to open and close;
a vane actuator coupled with the variable vane set to move the variable vane set in opening and closing directions; and
a controller coupled with the bleed control actuator and the vane actuator, the controller configured to:
determine whether the compressor is approaching the certain operating conditions;
operate, based on the speed and when the compressor is approaching the certain operating conditions, the variable vane sets through the vane actuator, and the at least one bleed port through the bleed control actuator, for any combination of the axial stages to avoid the certain operating conditions.

10. A method for stable operation of a compressor of a gas turbine engine, the method comprising:
including axial stages in the compressor, each respective axial stage in the axial stages having a rotor with rotor blades;
including, downstream from the axial stages, a centrifugal stage in the compressor, the centrifugal stage having a centrifugal impeller disposed;
generating air flows through the compressor first through the axial stages and then through the centrifugal stage;
including, for avoidance of certain operating conditions of the compressor, in each respective axial stage of the axial stages one of a variable vane set disposed upstream from the rotor blades of the respective axial stage, or at least one bleed port around the respective axial stage downstream from the rotor blades of the respective axial stage;
monitoring, by a controller, a speed of the engine;
determining, by the controller, whether the compressor is approaching the certain operating conditions;
scheduling, by the controller when the compressor is approaching the certain operating conditions and the speed is above a threshold, the variable vane set to move in an opening direction and the at least one bleed port to remain closed; and
scheduling, by the controller when the compressor is approaching the certain operating conditions and the speed is below the threshold, the variable vane set to moving in a closing direction and the at least one bleed port to open;
varying, by the variable vane set, an open flow for the air; and
selectively extracting, by the at least one bleed port, air from the respective axial stage.

11. The method of claim 10, comprising including the variable valve set in a first plural number of the axial stages and including the at least one bleed port in a second plural number of the axial stages.

12. The method of claim 10, comprising omitting both the variable vane set and the at least one bleed port in the centrifugal stage.

13. The method of claim 10, comprising:
scheduling, by the controller, based on the speed and when the compressor is approaching the certain operating conditions, operation of the variable vane set and the at least one bleed port for at least one of the axial stages to avoid the certain operating conditions.

14. The method of claim 10, comprising:
scheduling, by the controller based on the speed and when the compressor is approaching the certain operating conditions, operation of the variable vane set and the at least one bleed port for all of the axial stages to avoid the certain operating conditions.

15. The method of claim 10, comprising constructing the at least one bleed port as bleed ports so that a total bleed from the gas turbine engine is distributed to every one of the axial stages that do not include the variable valve set by including some of the bleed ports at the every one of the axial stages that do not include the variable valve set.

16. The method of claim 10, comprising:
including a stator downstream from the rotor of each of the respective axial stages; and
locating, in each of the respective axial stages that include the at least one bleed port, the at least one bleed port at a location that is downstream from the stator of the respective axial stage.

17. The method of claim 10, wherein the determining whether the compressor is approaching the certain operating conditions includes determining whether the compressor is approaching surge.

18. The method of claim 10, comprising including a bleed control valve to control flow through the at least one bleed port.

19. A system for stable operation of a compressor of a gas turbine engine, the system comprising:
axial stages, each respective axial stage in the axial stages including a rotor with blades, the axial stages including a first set of axial stages and a second set of axial stages, wherein the first set of axial stages and the second set of axial stages comprise all of the axial stages;
a stator in each of the axial stages, the stator of the respective stator's axial stage disposed downstream from the rotor of the respective stator's axial stage, each stator including stator vanes;
a centrifugal stage having a centrifugal impeller disposed downstream from the axial stages;
variable vane sets included in each individual stage of the first set of axial stages, where each of the individual stages in the first set of axial stages includes a variable vane set disposed upstream from the rotor blades of the respective individual stage, where one of the variable vane sets comprises inlet guide vanes that are disposed upstream from all of the axial stages, and others of the variable vane sets comprise the stator of the axial stage preceding the respective axial stage, each variable vane set configured to vary an open flow for the air;
at least one bleed port around each of the axial stages in the second set of axial stages, the at least one bleed port configured to selectively extract air from the respective axial stage;
a bleed control valve configured to control flow through the at least one bleed port of each respective axial stage in the second set of axial stages;
a bleed control actuator at each respective bleed control valve configured to move the respective bleed control valve to open and close;
an inlet guide vane actuator coupled with the inlet guide vanes to move the inlet guide vanes in opening and closing directions;
at least one stator actuator coupled with the stator vanes of at least one of the axial stages to move the stator vanes in opening and closing directions; and
a controller coupled with the bleed control actuators, the inlet guide vane actuator, and the at least one stator actuator, the controller configured to:
determine whether the compressor is approaching the certain operating conditions;
operate, based on the speed and when the compressor is approaching the certain operating conditions, the inlet guide vanes through the inlet guide vane actuator, the stator vanes through the stator actuator, and the at least one bleed port through the bleed control actuators, for any combination of the axial stages to avoid the certain operating conditions.

* * * * *